(No Model.)

W. WHITE.
CENTRIFUGAL AMALGAMATOR.

No. 355,958. Patented Jan. 11, 1887.

WITNESSES:
Dom Twitchell.
Edward Kent Jr.

INVENTOR:
William White
BY Munn & Co.
ATTORNEYS.

UNITED STATES PATENT OFFICE.

WILLIAM WHITE, OF MOUNT VERNON, ASSIGNOR TO RICHARD KELLEY AND JAMES B. BREWSTER, BOTH OF NEW YORK, N. Y.

CENTRIFUGAL AMALGAMATOR.

SPECIFICATION forming part of Letters Patent No. 355,958, dated January 11, 1887.

Application filed October 29, 1886. Serial No. 217,528. (No model.)

*To all whom it may concern:*

Be it known that I, WILLIAM WHITE, of Mount Vernon, in the county of Westchester and State of New York, have invented a new and Improved Centrifugal Amalgamator, of which the following is a full, clear, and exact description.

This invention relates to centrifugal amalgamators, the object of the invention being to provide an amalgamator wherein crushed ore or sand containing precious metals may be fed to a revoluble pan containing mercury, and having been so fed to the pan the crushed ore or metal containing sand will be caused to pass to and fro across the surface of said pan as it travels toward the periphery thereof under the effect of the rapid rotation of the pan, the amalgamator being applicable for use in connection with either wet or dry crushed ore or metal containing sand.

To the end named the invention consists of a revoluble disk arranged below a series of broken concentric riffs, as will be hereinafter more fully described, and specifically pointed out in the claims.

Reference is to be had to the accompanying drawings, forming a part of this specification, in which similar figures of reference indicate corresponding parts in both the views.

Figure 1:
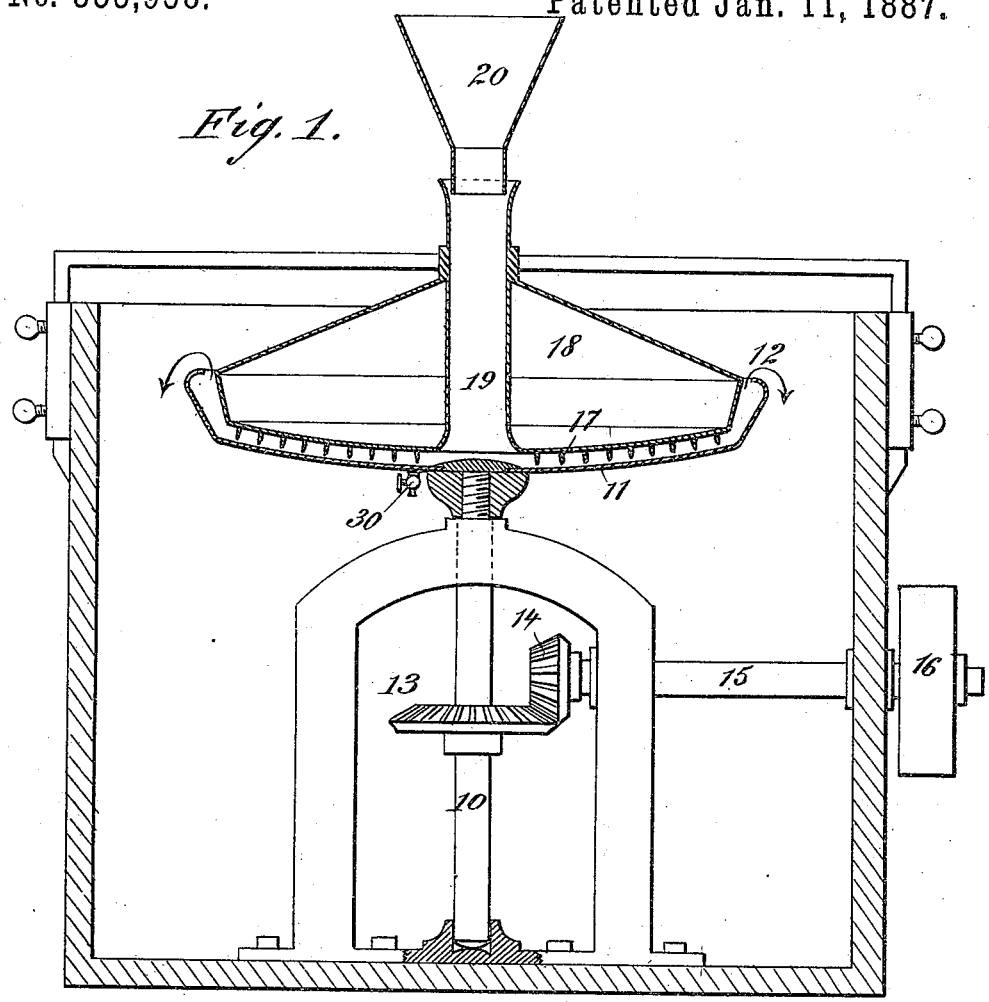
Figure 2:
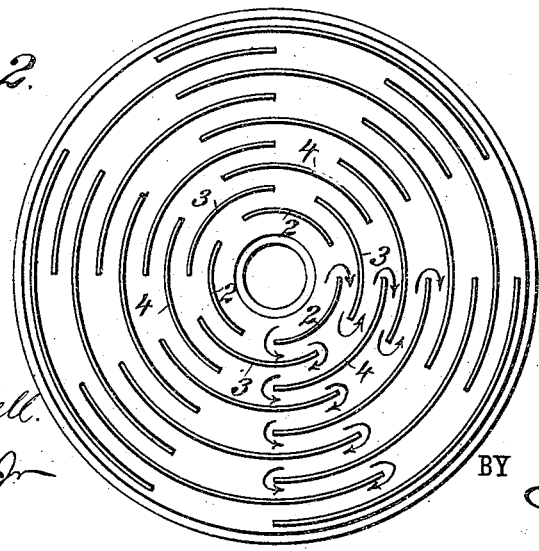

Figure 1 is a central sectional elevation of the amalgamator, and Fig. 2 is an inverted plan view of the stationary disk, that is provided with broken concentric riffs.

In the drawings, 10 represents a vertical shaft, to which there is rigidly connected a pan, 11, formed with an inwardly-bent upper edge, 12, the shaft being provided with a bevel gear-wheel, 13, that is engaged by a bevel-pinion, 14, carried by a horizontal shaft, 15, said shaft being arranged to be driven by any proper driving mechanism, but preferably through the medium of a belt that runs in engagement with a pulley, as 16.

Above the pan 11 there is mounted a disk, 17, in connection with which there is arranged a cover, 18. A feeding-tube, 19, leads upward from the center of the disk 17 to the discharge-orifice of a hopper, 20. The lower face of the disk 17 is provided with an inner set of riffs or ridges, 2, that are preferably arranged so that they are concentric with the axis of the pan 11, above which they are arranged. Beyond the riffs 2 there is a second series of riffs, 3, which break joint with the riffs 2, a third set of riffs, 4, being arranged beyond the riffs 3, these riffs breaking joint with the said riffs 3, and this arrangement of riffs is continued onward toward the peripheral edge of the disk.

In the bottom of the pan 11 there is a discharge-pipe, 30, through which the amalgam may be drawn off, the pipe being provided with a stop-cock or valve, as indicated.

In operation the ore is fed to the pan 11 from the hopper 20, such pan at this time being charged with mercury, which, under the effect of the rapid rotation of the pan, will fly to the periphery of said pan and form a wall beneath the inner turned flange, 12, a portion of the mercury, however, remaining upon the bottom of the pan. Then as the ore is fed to the pan it will gradually work outward toward the peripheral edge thereof, taking courses such as those indicated by the arrows shown in Fig. 2, so that in traveling from the center of the pan to its edge the ore will be obliged to pass to and fro across the surface of the pan, the ore finally passing outward over the upper edge of the pan, as indicated by the arrows shown in Fig. 1.

Now, although I have described this amalgamator as applicable for use in connection with either dry or wet crushed ore or sand, it will be found in practice to be better suited to the treatment of the material when wet.

The disk 17 and its cover are adjustably mounted above the tank in which the amalgamator is arranged, and the parts are rigidly connected to their supporting-arms 32.

Having thus fully described my invention, I claim as new and desire to secure by Letters Patent—

1. The combination, with a pan and means for revolving the same, of a disk provided with riffs arranged to break joint, substantially as described.

2. The combination, with a pan provided with a discharge orifice or tube, of a disk arranged above the pan, riffs secured to the disk and projecting downward therefrom, said riffs being practically concentric with the axis of the pan and arranged so that they break joint, as and for the purpose stated.

WILLIAM WHITE.

Witnesses:
EDWARD KENT, Jr.,
J. F. ACKER, Jr.